United States Patent
Xiao et al.

(10) Patent No.: US 11,899,542 B2
(45) Date of Patent: Feb. 13, 2024

(54) FILE DATA ACCESS METHOD, APPARATUS, AND COMPUTER-READABLE STORAGE MEDIUM

(71) Applicant: Inspur Suzhou Intelligent Technology Co., Ltd., Suzhou (CN)

(72) Inventors: Guodong Xiao, Suzhou (CN); Liqiang Zhang, Suzhou (CN)

(73) Assignee: INSPUR SUZHOU INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 17/802,828

(22) PCT Filed: Jul. 23, 2020

(86) PCT No.: PCT/CN2020/103690
§ 371 (c)(1),
(2) Date: Aug. 26, 2022

(87) PCT Pub. No.: WO2021/169163
PCT Pub. Date: Sep. 2, 2021

(65) Prior Publication Data
US 2023/0132278 A1 Apr. 27, 2023

(30) Foreign Application Priority Data
Feb. 28, 2020 (CN) .......................... 202010131232.6

(51) Int. Cl.
*G06F 11/00* (2006.01)
*G06F 11/14* (2006.01)

(52) U.S. Cl.
CPC ...... *G06F 11/1458* (2013.01); *G06F 11/1435* (2013.01); *G06F 11/1451* (2013.01)

(58) Field of Classification Search
CPC ............. G06F 11/1458; G06F 11/1435; G06F 11/1451
See application file for complete search history.

(56) References Cited

U.S. PATENT DOCUMENTS 5,778,395 A * 7/1998 Whiting .............. G06F 11/1453
8,606,751 B1 * 12/2013 Starling .............. G06F 11/1469
707/634

(Continued)

FOREIGN PATENT DOCUMENTS

| CN | 104360953 A | 2/2015 |
| CN | 108241555 A | 7/2018 |

(Continued)

OTHER PUBLICATIONS

Search report of corresponding CN priority application (CN202010131232.6) dated Aug. 22, 2022 including English translation (1 page).

(Continued)

*Primary Examiner* — Loan L. T. Truong
(74) *Attorney, Agent, or Firm* — Crowell & Moring LLP

(57) ABSTRACT

A file data access method and apparatus, and a medium. The method includes: when a file copy instruction is received, creating a backup file; recording, in metadata of an original file, identification information of the backup file, and recording, in metadata of the backup file, identification information of the original file; when a read instruction for a first target file is received, determining whether there is a data object corresponding to the first target file; if YES, reading the data object; and if NO, determining a first target original file associated with the first target file according to identification information recorded in metadata of the first target file, and reading a data object of the first target original file. During data backup, an original file may be backed up by merely (Continued)

recording, in metadata, identification information of an associated file, without copying a data object.

17 Claims, 4 Drawing Sheets

(56) References Cited

U.S. PATENT DOCUMENTS

| | | | | |
|---|---|---|---|---|
| 8,621,165 | B1* | 12/2013 | Sridharan | G06F 11/1471 |
| | | | | 707/649 |
| 9,128,942 | B1* | 9/2015 | Pfau | G06F 16/13 |
| 9,183,205 | B1* | 11/2015 | Kurne | G06F 16/113 |
| 10,592,161 | B1* | 3/2020 | Chen | G06F 3/0607 |
| 10,671,635 | B2* | 6/2020 | Zolotusky, Jr. | G06F 3/0685 |
| 11,360,852 | B1* | 6/2022 | Gladwin | G06F 3/06 |
| 11,403,176 | B2* | 8/2022 | De Schrijver | G06F 12/0875 |
| 11,599,296 | B2* | 3/2023 | Pandit | G06F 16/125 |
| 11,599,643 | B2* | 3/2023 | Wu | G06F 16/128 |
| 2005/0114291 | A1* | 5/2005 | Becker-Szendy | G06F 16/10 |
| 2005/0160305 | A1* | 7/2005 | Soejima | G06F 11/2028 |
| | | | | 714/2 |
| 2014/0040199 | A1* | 2/2014 | Golab | G06F 16/211 |
| | | | | 707/634 |
| 2015/0199243 | A1 | 7/2015 | Wu et al. | |
| 2015/0293984 | A1* | 10/2015 | Zolotusky, Jr. | G06F 16/1844 |
| | | | | 707/634 |
| 2016/0041884 | A1* | 2/2016 | Iwasaki | G06F 11/1451 |
| | | | | 707/646 |
| 2017/0090770 | A1* | 3/2017 | Minamiura | G06F 11/1469 |
| 2018/0239674 | A1* | 8/2018 | Hutchison | G06F 11/1469 |
| 2018/0285206 | A1* | 10/2018 | Mehta | G06F 11/1464 |
| 2018/0329785 | A1* | 11/2018 | Mosek | G06F 11/1451 |
| 2019/0317698 | A1* | 10/2019 | Pu | G06F 3/064 |
| 2019/0332574 | A1* | 10/2019 | Puri | G06F 3/0671 |
| 2019/0384495 | A1* | 12/2019 | Balcha | G06F 3/0619 |
| 2020/0201814 | A1* | 6/2020 | Danilov | G06F 16/9027 |
| 2020/0341855 | A1* | 10/2020 | Tanwer | G06F 11/1464 |
| 2021/0055953 | A1* | 2/2021 | Gupta | G06F 9/45558 |
| 2021/0109818 | A1* | 4/2021 | Perneti | G06F 11/324 |

FOREIGN PATENT DOCUMENTS

| | | |
|---|---|---|
| CN | 110008197 A | 7/2019 |
| CN | 110032541 A | 7/2019 |
| CN | 110795416 A | 2/2020 |
| CN | 111382011 A | 7/2020 |

OTHER PUBLICATIONS

Notification to Grant Patent Right for Invention of corresponding CN priority application (CN202010131232.6) dated Aug. 30, 2022 including English translation (2 pages).
International Search Report and Written Opinion, including English translations, of corresponding PCT application (PCT/CN2020/103690), dated Nov. 26, 2020 (13 pages).

* cited by examiner

FILE DATA ACCESS METHOD, APPARATUS, AND COMPUTER-READABLE STORAGE MEDIUM

This application is the national phase application of International Application No. PCT/CN2020/103690, filed Jul. 23, 2020, which claims priority to Chinese Patent Application No. 202010131232.6, filed on Feb. 28, 2020, in China National Intellectual Property Administration and entitled "File Data Access Method, Apparatus, and Computer-Readable Storage Medium", the contents of each of which are hereby incorporated by reference in its entirety.

FIELD

The present disclosure relates to the technical field of distributed file storage, and particularly to a file data access method, apparatus, and computer-readable storage medium.

BACKGROUND

An object-based distributed file system architecture consists of three parts: an underlying Distributed Object Storage (DOS), a Meta Data Server (MDS), and a file system Client Agent (CA). The DOS consisting of multiple server devices is responsible for a reliable distribution of data to these devices, and provides an object-based data access interface to outsiders. The MDS provides metadata services, wherein metadata can be stored in the DOS or independently. The CA simultaneously interacts with the MDS and the DOS, and externally implements a file access interface. File data is segmented into blocks of a certain size, and each block is stored as an object in the DOS.

A user generally accesses a file system through a Portable Operating System Interface of UNIX (POSIX). In this manner, a file copy operation is usually implemented as follows: an original file to be copied and a target file are simultaneously opened, and data in the original data is read to be written to the target file. Two problems are brought there. First, same data is stored twice in a system, wasting storage space. Second, a copy process needs a data read and write, and an operation is slow. These problems are particularly prominent when large files are copied. In a common storage system, the first problem is usually solved by a duplicate data deletion technology, while the second problem is not solved well.

Therefore, how to improve file copying performance is a problem that needs to be solved by those skilled in the art.

SUMMARY

An objective of embodiments of the present disclosure is to provide a file data access method, apparatus, and computer-readable storage medium, thereby improving file copying performance.

In order to solve a foregoing technical problem, the embodiments of the present disclosure provide a file data access method, including:

when a file copy instruction is received, creating a backup file;

recording, in metadata of an original file, identification information of the backup file, and recording, in metadata of the backup file, identification information of the original file;

when a read instruction for a first target file is received, determining whether there is a data object corresponding to the first target file;

if YES, reading the data object; and if NO, determining a first target original file associated with the first target file according to identification information recorded in metadata of the first target file, and reading a data object of the first target original file.

In some embodiments of the present disclosure, after the recording, in metadata of an original file, identification information of the backup file, and recording, in metadata of the backup file, identification information of the original file, the method further includes:

when a modification instruction for a second target backup file is received, determining whether there is a data object corresponding to the second target backup file;

if YES, modifying the data object corresponding to the second target backup file according to data contained in the modification instruction; and if NO, determining a second target original file associated with the second target backup file according to identification information recorded in metadata of the second target backup file, reading a data object of the second target original file, and determining the data contained in the modification instruction and the data object of the second target original file as a data object of the second target backup file, and storing the data object of the second target backup file.

In some embodiments of the present disclosure, the reading a data object of the second target original file includes:

opening the second target original file in a read-only mode so as to obtain a read access to the second target original file; and storing, in an internal memory, the data object of the second target original file read from a DOS.

In some embodiments of the present disclosure, after the recording, in metadata of an original file, identification information of the backup file, and recording, in metadata of the backup file, identification information of the original file, the method further includes:

when a modification instruction for a third target original file is received, locating a third target backup file associated with the third target original file according to identification information recorded in metadata of the third target original file;

determining whether there is a data object corresponding to each third target backup file;

determining whether there is a data object corresponding to each third target backup file;

if YES, modifying a data object corresponding to the third target original file according to data contained in the modification instruction for the third target original file; and if NO, copying the data object of the third target original file to a storage path of the third target backup file without the data object, and executing a step of the modifying a data object corresponding to the third target original file according to data contained in the modification instruction for the third target original file.

In some embodiments of the present disclosure, the method further includes:

when there is no data object corresponding to the target file and no target original file associated with the target file is able to be determined according to the identification information recorded in the metadata of the target file, giving an alarm prompt.

The embodiments of the present disclosure also provide a file data access apparatus, including a creation unit, a recording unit, a first judgment unit, a first reading unit, and a second reading unit.

The creation unit is configured to, when a file copy instruction is received, create a backup file.

The recording unit is configured to record, in metadata of an original file, identification information of the backup file, and record, in metadata of the backup file, identification information of the original file.

The first judgment unit is configured to, when a read instruction for a first target file is received, determine whether there is a data object corresponding to the first target file, if YES, trigger the first reading unit, and if NO, trigger the second reading unit.

The first reading unit is configured to read the data object.

The second reading unit is configured to determine a first target original file associated with the first target file according to identification information recorded in metadata of the first target file, and read a data object of the first target original file.

In some embodiments of the present disclosure, the apparatus further includes a second judgment unit, a first modification unit, a determination unit, a third reading unit, and a determining-as unit.

The second judgment unit is configured to, when a modification instruction for a second target backup file is received, determine whether there is a data object corresponding to the second target backup file, if YES, trigger the first modification unit, and if NO, trigger the determination unit.

The first modification unit is configured to modify the data object corresponding to the second target backup file according to data contained in the modification instruction.

The determination unit is configured to determine a second target original file associated with the second target backup file according to identification information recorded in metadata of the second target backup file.

The third reading unit is configured to read a data object of the second target original file.

The determining-as unit is configured to determine the data contained in the modification instruction and the data object of the second target original file as a data object of the second target backup file, and store the data object of the second target backup file.

In some embodiments of the present disclosure, the third reading unit is specifically configured to open the second target original file in a read-only mode so as to obtain a read access to the second target original file, and store, in an internal memory, the data object of the second target original file read from a DOS.

In some embodiments of the present disclosure, the apparatus further includes a locating unit, a third judgment unit, a copy unit, and a second modification unit.

The locating unit is configured to, when a modification instruction for a third target original file is received, locate a third target backup file associated with the third target original file according to identification information recorded in metadata of the third target original file.

The third judgment unit is configured to determine whether there is a data object corresponding to each third target backup file, if YES, trigger the second modification unit, and if NO, trigger the copy unit.

The second modification unit is configured to modify a data object corresponding to the third target original file according to data contained in the modification instruction for the third target original file.

The copy unit is configured to copy the data object of the third target original file to a storage path of the third target backup file without the data object, and trigger the second modification unit.

In some embodiments of the present disclosure, the apparatus further includes a prompting unit.

The prompting unit is configured to, when there is no data object corresponding to the target file and no target original file associated with the target file is able to be determined according to the identification information recorded in the metadata of the target file, give an alarm prompt.

The embodiments of the present disclosure also provide a file data access apparatus, including:

a memory, configured to store a computer program; and a processor, configured to execute the computer program to implement any steps of the file data access method as described above.

The embodiments of the present disclosure also provide a computer-readable storage medium, storing a computer program that is executed by a processor to implement any steps of the file data access method as described above.

It can be seen from the technical solutions that, when the file copy instruction is received, the backup file is created, the identification information of the backup file is recorded in the metadata of the original file, and the identification information of the original file is recorded in the metadata of the backup file. Different files can be distinguished by the identification information, and the files can be located according to the identification information. When the file copy operation is performed, the original file can be backed up by merely recording, in the metadata, the identification information of the associated file, without copying the data object, whereby data backup efficiency is improved greatly. When the read instruction for the first target file is received, whether there is the data object corresponding to the first target file is determined. When there is the data object corresponding to the first target file, the data object can be read directly. When there is no data object corresponding to the first target file, it is necessary to read the data object from the original file associated with the first target file. In such case, the first target original file associated with the first target file is determined according to the identification information recorded in the metadata of the first target file, and the data object of the first target original file is read. During a data backup, the original file and the backup file share a data object, effectively reducing occupation of a disk space, and improving the file copying performance.

BRIEF DESCRIPTION OF THE DRAWINGS

In order to describe the embodiments of the present disclosure more clearly, the drawings required to be used in the embodiments will be introduced briefly below. Apparently, the drawings in the description below are only some embodiments of the present disclosure. Those ordinarily skilled in the art can further obtain other drawings according to these drawings without creative work.

DETAILED DESCRIPTION

The technical solutions in the embodiments of the present disclosure will be described clearly and completely below in combination with the drawings in the embodiments of the present disclosure. Clearly, the described embodiments are not all but only part of embodiments of the present disclosure. All other embodiments obtained by those ordinarily skilled in the art based on the embodiments in the present disclosure without creative work shall fall within the scope of protection of the present disclosure.

In order to make the solutions of the present disclosure understood better by those skilled in the art, the present disclosure will be further described below in detail in combination with the drawings and specific implementation modes.

Figure 1:
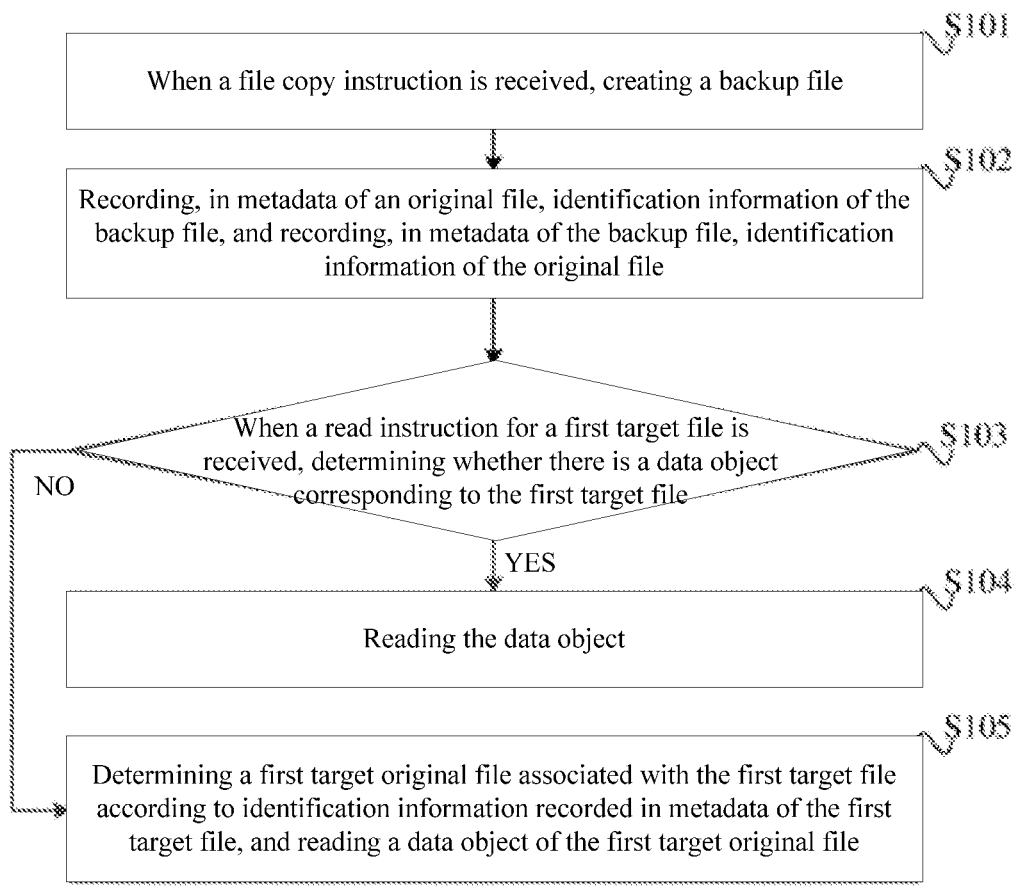
FIG. 1 is a flowchart of a file data access method according to some embodiments of the present disclosure.

A file data access method provided in the embodiments of the present disclosure is then introduced in detail. FIG. 1 is a flowchart of a file data access method according to some embodiments of the present disclosure. The method includes following steps.

In S101, when a file copy instruction is received, a backup file is created.

A distributed file system consists of a CA, a MDS, and a DOS. The CA, equivalent to an access interface of the distributed file system, can implement interaction with a user terminal.

When a user performs a file copy operation, it is necessary to create the backup file first in the distributed file system. During specific implementation, the user can send the file copy instruction to the distributed file system through a service system of the user terminal. The copy instruction can contain identification information of an original file, thereby the distributed file system knowing which file the copy operation needs to be performed on.

When receiving the file copy instruction, the CA of the distributed file system can transmit the file copy instruction to the MDS, thereby the MDS creating the backup file. The backup file created includes no real data information, namely including no data object.

In practical applications, after the copy operation is performed on the original file a to obtain the backup file b, the copy operation can be performed again on the backup file b to obtain a backup file c. Although the backup file c is a file obtained by executing the copy operation on the backup file b, when the copy operation is performed, the backup file b shares a data object with the original file a, and the data object is recorded in the original file a. Therefore, the backup file c shares the data object with the original file a. For ease of reading the data object of the backup file c, in some embodiments of the present disclosure, the original file corresponding to the backup file c refers to the original file a.

Correspondingly, when the backup file b is created for the original file a, identification information of the backup file b can be recorded in metadata of the original file a, and identification information of the original file a can be recorded in metadata of the backup file b. When the copy operation is performed again on the backup file b to obtain the backup file c, identification information of the backup file c can be added to the metadata of the original file a, and correspondingly, the identification information of the original file a can be recorded in metadata of the backup file c.

In S102, the identification information of the backup file is recorded in metadata of an original file, and the identification information of the original file is recorded in metadata of the backup file.

The number of the backup files corresponding to one original file is multiple. In some embodiments of the present disclosure, different files are distinguished by identification information.

During specific implementation, an index number can be used as identification information of a file. Each file has a unique corresponding index number that can include information such as a name of the file, a storage path of the file, etc.

In some embodiments of the present disclosure, in order to improve file backup efficiency, the original file and the backup file can share a data object. In such case, it is only necessary to record, in the metadata of the original file, the identification information of the backup file and record, in the metadata of the backup file, the identification information of the original file, without copying the data object.

In S103, when a read instruction for a first target file is received, whether there is a data object corresponding to the first target file is determined.

The first target file can be the original file or the backup file.

When receiving the read instruction for the first target file, the CA of the distributed file system can read the data object corresponding to the first target file from the DOS.

When there is the data object of the first target file, S104 is performed. When there is no data object of the first target file, it indicates that the first target file shares a data object with an associated original file. In such case, the data object corresponding to the original file needs to be read, that is, S105 is performed.

In S104, the data object is read.

When there is the data object corresponding to the first target file, it indicates that the first target file is the original file or the backup file obtained by a copy-on-write. In such case, the data object can be read directly.

In S105, a first target original file associated with the first target file is determined according to identification information recorded in metadata of the first target file, and a data object of the first target original file is read.

When there is no data object corresponding to the first target file, it indicates that the first target file is very likely to be the backup file. For ease of distinction, in some embodiments of the present disclosure, the original file associated with the first target file can be referred to as the first target original file.

Identification information of the associated first target original file is recorded in the metadata of the first target file, and the first target original file can be found according to the identification information. A data object corresponding to the first target original file is the data object of the first target file.

It can be seen from a technical solution that, when the file copy instruction is received, the backup file is created. The identification information of the backup file is recorded in the metadata of the original file, and the identification information of the original file is recorded in the metadata of the backup file. Different files can be distinguished by the identification information, and the files can be located according to the identification information. When the file copy operation is performed, the original file can be backed up by merely recording, in metadata, identification information of an associated file without copying the data object, whereby data backup efficiency is improved effectively. When the read instruction for the first target file is received, whether there is the data object corresponding to the first target file is determined. When there is the data object corresponding to the first target file, the data object can be read directly. When there is no data object corresponding to the first target file, it is necessary to read the data object from the original file associated with the first target file. In such case, the first target original file associated with the first target file is determined according to the identification information recorded in the metadata of the first target file, and the data object of the first target original file is read. During a data backup, the original file and the backup file share a data object, effectively reducing occupation of a disk space, and improving file copying performance.

Figure 2:
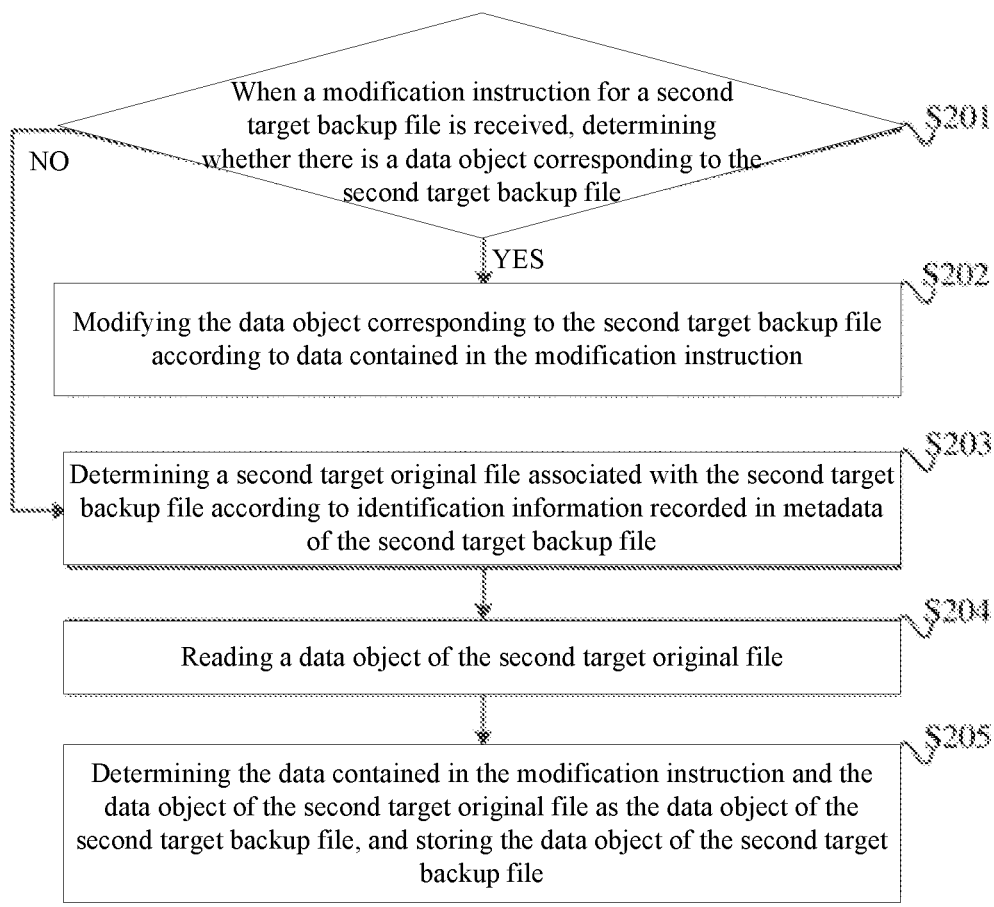
FIG. 2 is a flowchart of a method for modifying a backup file according to some embodiments of the present disclosure.

After the original file is backed up, the backup file can be modified according to a service requirement. FIG. 2 is a flowchart of a method for modifying the backup file according to some embodiments of the present disclosure. The method includes following steps.

In S201, when a modification instruction for a second target backup file is received, whether there is a data object corresponding to the second target backup file is determined.

In some embodiments of the present disclosure, for ease of distinction from another backup file, the backup file that needs to be modified can be referred to as a second target backup file.

During specific implementation, the user can send the modification instruction for the second target backup file to the CA of the distributed file system through the service system of the user terminal. The modification instruction can contain identification information of the second target backup file and data that needs to be modified, thereby the distributed file system knowing which file to be modified.

When the CA of the distributed file system receives the modification instruction for the second target backup file, if there is the data object corresponding to the second target backup file, it indicates that the copy-on-write operation has been performed on the second target backup file. In such case, the data object corresponding to the second target backup file can be read from the DOS, and S202 is performed.

When there is no data object corresponding to the second target backup file, it indicates that the second target backup file still shares the data object with an associated original file. In such case, S203 can be performed.

In S202, the data object corresponding to the second target backup file is modified according to data contained in the modification instruction.

The data contained in the modification instruction is the data that needs to be modified. Corresponding data in the data object is replaced with the data that needs to be modified, thereby completing the modification of the data object of the second target backup file.

In S203, a second target original file associated with the second target backup file is determined according to the identification information recorded in metadata of the second target backup file.

For ease of distinction, in some embodiments of the present disclosure, the original file associated with the second target backup file can be referred to as a second target original file.

In S204, a data object of the second target original file is read.

When a data object of the backup file needs to be modified, a data object of an original file needs not to be modified. In order to avoid the data object corresponding to the original file being modified by mistake, during specific implementation, the second target original file is opened in a read-only mode so as to obtain a read access to the second target original file, and then the data object of the second target original file read from the distributed objected storage is stored in an internal memory.

Storing the read data object in the internal memory implements the copying of the data object of the second target original file, thereby ensuring that only the data object stored in the internal memory is modified and the data object corresponding to the second target original file is not modified.

In S205, the data contained in the modification instruction and the data object of the second target original file are determined as a data object of the second target backup file, and the data object of the second target backup file is stored.

After the data object of the second target original file is stored in the internal memory, corresponding data in the data object in the internal memory can be replaced with the data contained in the modification instruction, thereby completing the modification of the data object of the second target backup file. The modified data object is stored in the DOS as the data object of the second target backup file.

Storing the data object of the second target backup file implements a copy-on-write operation over the second target backup file.

Figure 3:
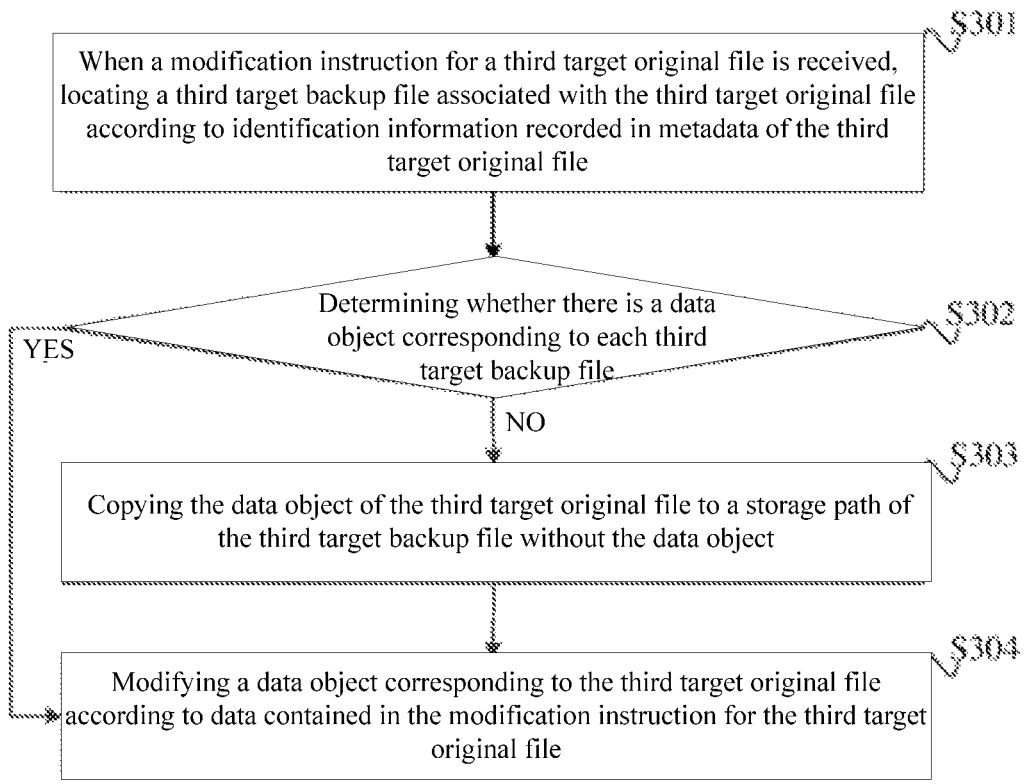
FIG. 3 is a flowchart of a method for modifying an original file according to some embodiments of the present disclosure.

After the original file is backed up, the original file can be modified according to the service requirement. FIG. 3 is a flowchart of a method for modifying the original file according to some embodiments of the present disclosure. The method includes following steps.

In S301, when the modification instruction for a third target original file is received, a third target backup file associated with the third target original file is located according to identification information recorded in metadata of the third target original file.

In some embodiments of the present disclosure, for ease of distinction from another original file, the original file that needs to be modified can be referred to as a third target original file. The backup file associated with the third target original file can be referred to as a third target backup file.

In practical applications, when modification of the original file required, modification of the backup file associated with the original file is not involved. Therefore, prior to a modification operation over a data object corresponding to the original file, it is necessary to ensure that there is the data object corresponding to each backup file.

In S302, whether there is a data object corresponding to each third target backup file is determined.

The number of the third target original file associated with the third target backup files can be multiple. When there are data objects corresponding to all the third target backup files, it indicates that the data objects of the third target backup files have been separated from that of the original file, and in such case, a modification operation can be performed on the data object of the original file without affecting the data objects of the third target backup files. Therefore, when there is the data object corresponding to each third target backup file, S304 can be performed.

When there is the third target backup file without the data object, it indicates that the third target backup file without the data object still shares the data object with the third target original file. In order to avoid the data object of the backup file being modified, S303 can be performed at this point.

In S303, the data object of the third target original file is copied to a storage path of a third target backup file without the data object.

For a third target backup file without the data object, the data object of the third target original file can be copied to a storage path of the third target backup file as the data object of the third target backup file.

In S304, a data object corresponding to the third target original file is modified according to data contained in the modification instruction for the third target original file.

When there are data objects corresponding to all third target backup files, the data object corresponding to the third target original file can be modified according to data contained in the modification instruction for the third target original file.

Copying, prior to modification of a data object of the original file, the data object to the backup file associated with the original file and without the data object can effectively ensure that the data object of each backup file is separated from that of the original file, thereby avoiding an influence of modification of the original file on data of the backup file.

In practical applications, when the data object of the target file needs to be acquired, because the identification information of the target file input by the user is incorrect, or the target file does not exist, or for other reasons there can be no data object corresponding to the target file, and the target original file associated with the target file cannot be determined according to the identification information recorded in the metadata of the target file. In such case, the alarm prompt can be given such that the user can timely know that the data object fails to be acquired.

Figure 4:
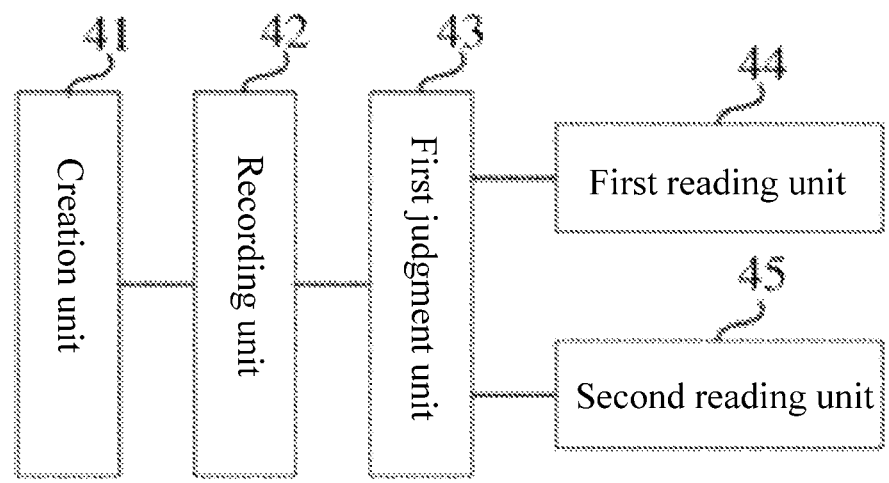
FIG. 4 is a schematic structural diagram of a file data access apparatus according to some embodiments of the present disclosure.

FIG. 4 is a schematic structural diagram of a file data access apparatus according to some embodiments of the present disclosure, including a creation unit 41, a recording unit 42, a first judgment unit 43, a first reading unit 44, and a second reading unit 45.

The creation unit 41 is configured to, when a file copy instruction is received, create a backup file.

The recording unit 42 is configured to record, in metadata of an original file, identification information of the backup file, and record, in metadata of the backup file, identification information of the original file.

The first judgment unit 43 is configured to, when a read instruction for a first target file is received, determine whether there is a data object corresponding to the first target file, if YES, trigger the first reading unit 44, and if NO, trigger the second reading unit 45.

The first reading unit 44 is configured to read the data object.

The second reading unit 45 is configured to determine a first target original file associated with the first target file according to identification information recorded in metadata of the first target file, and read a data object of the first target original file.

In some embodiments of the present disclosure, the apparatus further includes a second judgment unit, a first modification unit, a determination unit, a third reading unit, and a determining-as unit.

The second judgment unit is configured to, when a modification instruction for a second target backup file is received, determine whether there is a data object corresponding to the second target backup file, if YES, trigger the first modification unit, and if NO, trigger the determination unit.

The first modification unit is configured to modify the data object corresponding to the second target backup file according to data contained in the modification instruction.

The determination unit is configured to determine a second target original file associated with the second target backup file according to identification information recorded in metadata of the second target backup file.

The third reading unit is configured to read a data object of the second target original file.

The determining-as unit is configured to determine the data contained in the modification instruction and the data object of the second target original file as a data object of the second target backup file, and store the data object of the second target backup file.

In some embodiments of the present disclosure, the third reading unit is specifically configured to open the second target original file in a read-only mode so as to obtain a read access to the second target original file, and store, in an internal memory, the data object of the second target original file read from a DOS.

In some embodiments of the present disclosure, the apparatus further includes a locating unit, a third judgment unit, a copy unit, and a second modification unit.

The locating unit is configured to, when a modification instruction for a third target original file is received, locate a third target backup file associated with the third target original file according to identification information recorded in metadata of the third target original file.

The third judgment unit is configured to determine whether there is a data object corresponding to each third target backup file, if YES, trigger the second modification unit, and if NO, trigger the copy unit.

The second modification unit is configured to modify a data object corresponding to the third target original file according to data contained in the modification instruction for the third target original file.

The copy unit is configured to copy the data object of the third target original file to a storage path of a third target backup file without the data object, and trigger the second modification unit.

In some embodiments of the present disclosure, the apparatus further includes a prompting unit.

The prompting unit is configured to, when there is no data object corresponding to the target file and no target original file associated with the target file is able to be determined according to the identification information recorded in the metadata of the target file, give an alarm prompt.

Descriptions about features in the embodiment corresponding to FIG. 4 can refer to the related descriptions in the embodiments corresponding to FIGS. 1 to 3. Elaborations are omitted herein.

It can be seen from the technical solution that, when the file copy instruction is received, the backup file is created, the identification information of the backup file is recorded in the metadata of the original file, and the identification information of the original file is recorded in the metadata of the backup file. Different files can be distinguished by the identification information, and the files can be located according to the identification information. When the file copy operation is performed, the original file can be backed up by merely recording, in the metadata, the identification information of the associated file, without copying the data object, whereby the data backup efficiency is improved greatly. When the read instruction for the first target file is received, whether there is the data object corresponding to the first target file is determined. When there is the data object corresponding to the first target file, the data object can be read directly. When there is no data object corresponding to the first target file, it is necessary to read the data object from the original file associated with the first target file. In such case, the first target original file associated with the first target file is determined according to the identification information recorded in the metadata of the first target file, and the data object of the first target original file is read. During the data backup, the original file and the backup file share the data object, effectively reducing the occupation of the disk space, and improving the file copying performance.

Figure 5:
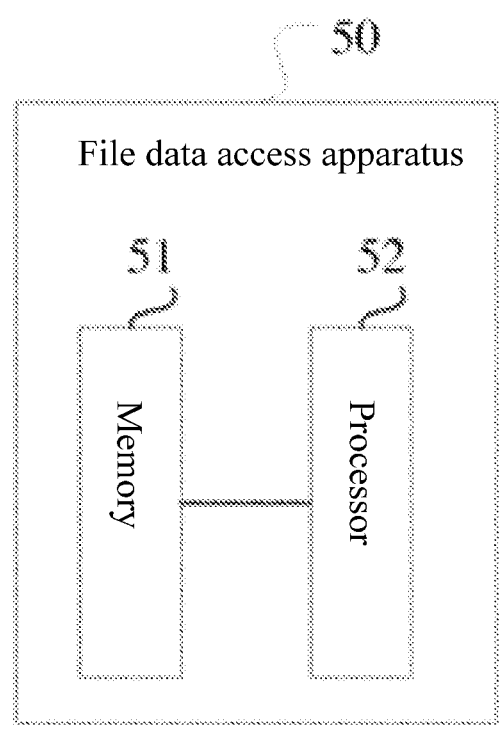
FIG. 5 is a schematic diagram of a hardware structure of the file data access apparatus according to some embodiments of the present disclosure.

FIG. 5 is a schematic diagram of a hardware structure of a file data access apparatus 50 according to some embodiments of the present disclosure, including:

a memory 51, configured to store a computer program; and a processor 52, configured to execute the computer program to implement any steps of the file data access method as described in any one of the above embodiments.

The embodiments of the present disclosure also provide a computer-readable storage medium, storing the computer program that is executed by a processor to implement any steps of the file data access method as described in any one of the above embodiments.

The file data access method and apparatus and computer-readable storage medium provided in the embodiments of the present disclosure are introduced above in detail. Each embodiment in the specification is described progressively. Descriptions made in each embodiment focus on differences from the other embodiments, and the same or similar parts in each embodiment refer to the other embodiments. The apparatus disclosed in the embodiments corresponds to the method disclosed in the embodiments, and thus is described relatively briefly, and related parts refer to the descriptions about the method. It is to be pointed out that those ordinarily skilled in the art can further make a plurality of improvements and embellishments to the present disclosure without departing from the principle of the present disclosure, and these improvements and embellishments shall also fall within the scope of protection of the claims of the present disclosure.

Professionals can further realize that the units and algorithm steps of each example described in combination with the embodiments disclosed herein can be implemented by electronic hardware, computer software, or a combination thereof. In order to describe the interchangeability of hardware and software clearly, the compositions and steps of each example have been described generally in the foregoing descriptions according to functions. Whether these functions are executed by hardware or software depends on specific applications and design constraints of the technical solutions. Professionals can realize the described functions for each specific application by use of different methods, but such realization shall fall within the scope of the present disclosure.

The steps of the method or algorithm described in combination with the embodiments disclosed herein can directly be implemented by hardware, a software module executed by the processor, or a combination thereof. The software module can be arranged in a Random Access Memory (RAM), an internal memory, a Read-Only Memory (ROM), an electrically programmable ROM, an electrically erasable programmable ROM, a register, a hard disk, a removable disk, a Compact Disc Read-Only Memory (CD-ROM), or a storage medium in any other form well known in this art.

The invention claimed is:

1. A file data access method, comprising:
   in response to a determination that a file copy instruction is received, creating a backup file comprising no data object;
   recording, in metadata of an original file, identification information of the backup file, and recording, in metadata of the backup file, identification information of the original file;
   in response to a determination that a read instruction for a target file is received, determining whether there is a data object corresponding to the target file;
   in response to a determination that there is the data object corresponding to the target file, reading the data object;
   in response to a determination that there is no data object corresponding to the target file, determining whether there is a first target original file associated with the target file according to identification information recorded in metadata of the target file;
   in response to a determination that there is the first target original file associated with the target file according to the identification information recorded in the metadata of the target file, reading a data object of the first target original file; and
   in response to a determination that there is no data object corresponding to the target file and no target original file associated with the target file is able to be determined according to the identification information recorded in the metadata of the target file, giving an alarm prompt.

2. The method according to claim 1, wherein after the recording, in metadata of an original file, identification information of the backup file, and recording, in metadata of the backup file, identification information of the original file, the method further comprises:
   in response to a determination that a modification instruction for a first target backup file is received, determining whether there is a data object corresponding to the first target backup file;
   in response to a determination that there is the data object corresponding to the first target backup file, modifying the data object corresponding to the first target backup file according to data contained in the modification instruction;
   in response to a determination that there is no data object corresponding to the first target backup file, determining a second target original file associated with the first target backup file according to identification information recorded in metadata of the first target backup file;
   reading a data object of the second target original file; and
   determining the data contained in the modification instruction and the data object of the second target original file as the data object of the first target backup file, and storing the data object of the first target backup file.

3. The method according to claim 2, wherein the reading a data object of the second target original file comprises:
   opening the second target original file in a read-only mode so as to obtain a read access to the second target original file; and
   storing, in an internal memory, the data object of the second target original file read from a Distributed Object Storage (DOS).

4. The method according to claim 1, wherein after the recording, in metadata of an original file, identification information of the backup file, and recording, in metadata of the backup file, identification information of the original file, the method further comprises:
   in response to a determination that a modification instruction for a third target original file is received, locating a second target backup file associated with the third target original file according to identification information recorded in metadata of the third target original file;

determining whether there is a data object corresponding to each second target backup file;

in response to a determination that there is the data object corresponding to the second target backup file, modifying a data object corresponding to the third target original file according to data contained in the modification instruction for the third target original file;

in response to a determination that there is no data object corresponding to the second target backup file, copying the data object of the third target original file to a storage path of the second target backup file; and modifying the data object corresponding to the third target original file according to the data contained in the modification instruction for the third target original file.

5. The method according to claim 1, wherein the target file is the backup file.

6. The method according to claim 1, wherein the in response to a determination that a read instruction for a target file is received, determining whether there is a data object corresponding to the target file comprises:

in response to a determination that the read instruction for the target file is received, determining whether the data object corresponding to the target file is read from a distributed object storage;

in response to a determination that the data object corresponding to the target file is read from the distributed object storage, determining that there is the data object corresponding to the target file; and in response to a determination that the data object corresponding to the target file is not read from the distributed object storage, determining that there is no data object corresponding to the target file.

7. A file data access apparatus, comprising:

a memory, configured to store a computer program; and a processor, configured to execute the computer program, and upon execution of the computer program, is configured to:

in response to a determination that a file copy instruction is received, create a backup file comprising no data object;

record, in metadata of an original file, identification information of the backup file, and record, in metadata of the backup file, identification information of the original file;

in response to a determination that a read instruction for a target file is received, determine whether there is a data object corresponding to the target file;

in response to a determination that there is the data object corresponding to the target file, read the data object;

in response to a determination that there is no data object corresponding to the target file, determine whether there is a first target original file associated with the target file according to identification information recorded in metadata of the target file;

in response to a determination that there is the first target original file associated with the target file according to the identification information recorded in the metadata of the target file, read a data object of the first target original file; and in response to a determination that there is no data object corresponding to the target file and no target original file associated with the target file is able to be determined according to the identification information recorded in the metadata of the target file, giving an alarm prompt.

8. The file data access apparatus according to claim 7, wherein after the record, in metadata of an original file, identification information of the backup file, and record, in metadata of the backup file, identification information of the original file, the processor, upon execution of the computer program, is further configured to:

in response to a determination that a modification instruction for a first target backup file is received, determine whether there is a data object corresponding to the first target backup file;

in response to a determination that there is the data object corresponding to the first target backup file, modify the data object corresponding to the first target backup file according to data contained in the modification instruction;

in response to a determination that there is no data object corresponding to the first target backup file, determine a second target original file associated with the first target backup file according to identification information recorded in metadata of the first target backup file;

read a data object of the second target original file; and determine the data contained in the modification instruction and the data object of the second target original file as the data object of the first target backup file, and store the data object of the first target backup file.

9. The file data access apparatus according to claim 7, wherein in order to read a data object of the second target original file, the processor, upon execution of the computer program, is configured to:

open the second target original file in a read-only mode so as to obtain a read access to the second target original file; and store, in an internal memory, the data object of the second target original file read from a Distributed Object Storage (DOS).

10. The file data access apparatus according to claim 7, wherein after the record, in metadata of original file, identification information of the backup file, and record, in metadata of the backup file, identification information of the original file, the processor, upon execution of the computer program, is further configured to:

in response to a determination that a modification instruction for a third target original file is received, locate a second target backup file associated with the third target original file according to identification information recorded in metadata of the third target original file;

determine whether there is a data object corresponding to each second target backup file;

in response to a determination that there is the data object corresponding to the second target backup file, modify a data object corresponding to the third target original file according to data contained in the modification instruction for the third target original file;

in response to a determination that there is no data object corresponding to the second target backup file, copy the data object of the third target original file to a storage path of the second target backup file; and modify the data object corresponding to the third target original file according to the data contained in the modification instruction for the third target original file.

11. The file data access apparatus according to claim 7, wherein the target file is the backup file.

12. The file data access apparatus according to claim 7, wherein in order to determine whether there is a data object corresponding to the target file, the processor, upon execution of the computer program, is configured to:
- in response to a determination that the read instruction for the target file is received, determine whether the data object corresponding to the target file is read from a distributed object storage;
- in response to a determination that the data object corresponding to the target file is read from the distributed object storage, determine that there is the data object corresponding to the target file; and
- in response to a determination that the data object corresponding to the target file is not read from the distributed object storage, determine that there is no data object corresponding to the target file.

13. A non-transitory storage medium, storing a computer program that is executable by a processor, wherein upon execution by the processor, is configured to cause the processor to:
- in response to a determination that a file copy instruction is received, create a backup file comprising no data object;
- record, in metadata of an original file, identification information of the backup file, and record, in metadata of the backup file, identification information of the original file;
- in response to a determination that a read instruction for a target file is received, determine whether there is a data object corresponding to the target file;
- in response to a determination that there is the data object corresponding to the target file, read the data object;
- in response to a determination that there is no data object corresponding to the target file, determine whether there is a first target original file associated with the target file according to identification information recorded in metadata of the target filer;
- in response to a determination that there is the first target original file associated with the target file according to the identification information recorded in the metadata of the target file, read a data object of the first target original file; and
- in response to a determination that there is no data object corresponding to the target file and no target original file associated with the target file is able to be determined according to the identification information recorded in the metadata of the target file, giving an alarm prompt.

14. The non-transitory storage medium according to claim 13, wherein after the record, in metadata of an original file, identification information of the backup file, and record, in metadata of the backup file, identification information of the original file, the computer program, upon execution by the computer program, is further configured to cause the processor to:
- in response to a determination that a modification instruction for a first target backup file is received, determine whether there is a data object corresponding to the first target backup file;
- in response to a determination that there is the data object corresponding to the first target backup file, modify the data object corresponding to the first target backup file according to data contained in the modification instruction;
- in response to a determination that there is no data object corresponding to the first target backup file, determine a second target original file associated with the first target backup file according to identification information recorded in metadata of the first target backup file;
- read a data object of the second target original file; and
- determine the data contained in the modification instruction and the data object of the second target original file as the data object of the first target backup file, and store the data object of the first target backup file.

15. The non-transitory storage medium according to claim 13, wherein in order to read a data object of the second target original file, the computer program, upon execution by the processor, is configured to cause the processor to:
- open the second target original file in a read-only mode so as to obtain a read access to the second target original file; and
- store, in an internal memory, the data object of the second target original file read from a Distributed Object Storage (DOS).

16. The non-transitory storage medium according to claim 13, wherein after the record, in metadata of an original file, identification information of the backup file, and record, in metadata of the backup file, identification information of the original file, the computer program, upon execution by the processor, is configured to cause the processor to:
- in response to a determination that a modification instruction for a third target original file is received, locate a second target backup file associated with the third target original file according to identification information recorded in metadata of the third target original file;
- determine whether there is a data object corresponding to each second target backup file;
- in response to a determination that there is the data object corresponding to the second target backup file, modify a data object corresponding to the third target original file according to data contained in the modification instruction for the third target original file;
- in response to a determination that there is no data object corresponding to the second target backup file, copy the data object of the third target original file to a storage path of the second target backup file; and
- modify the data object corresponding to the third target original file according to the data contained in the modification instruction for the third target original file.

17. The non-transitory storage medium according to claim 13, wherein the target file is the backup file.

* * * * *